LIGHT-SENSITIVE CIRCUIT
Filed Dec. 19, 1952
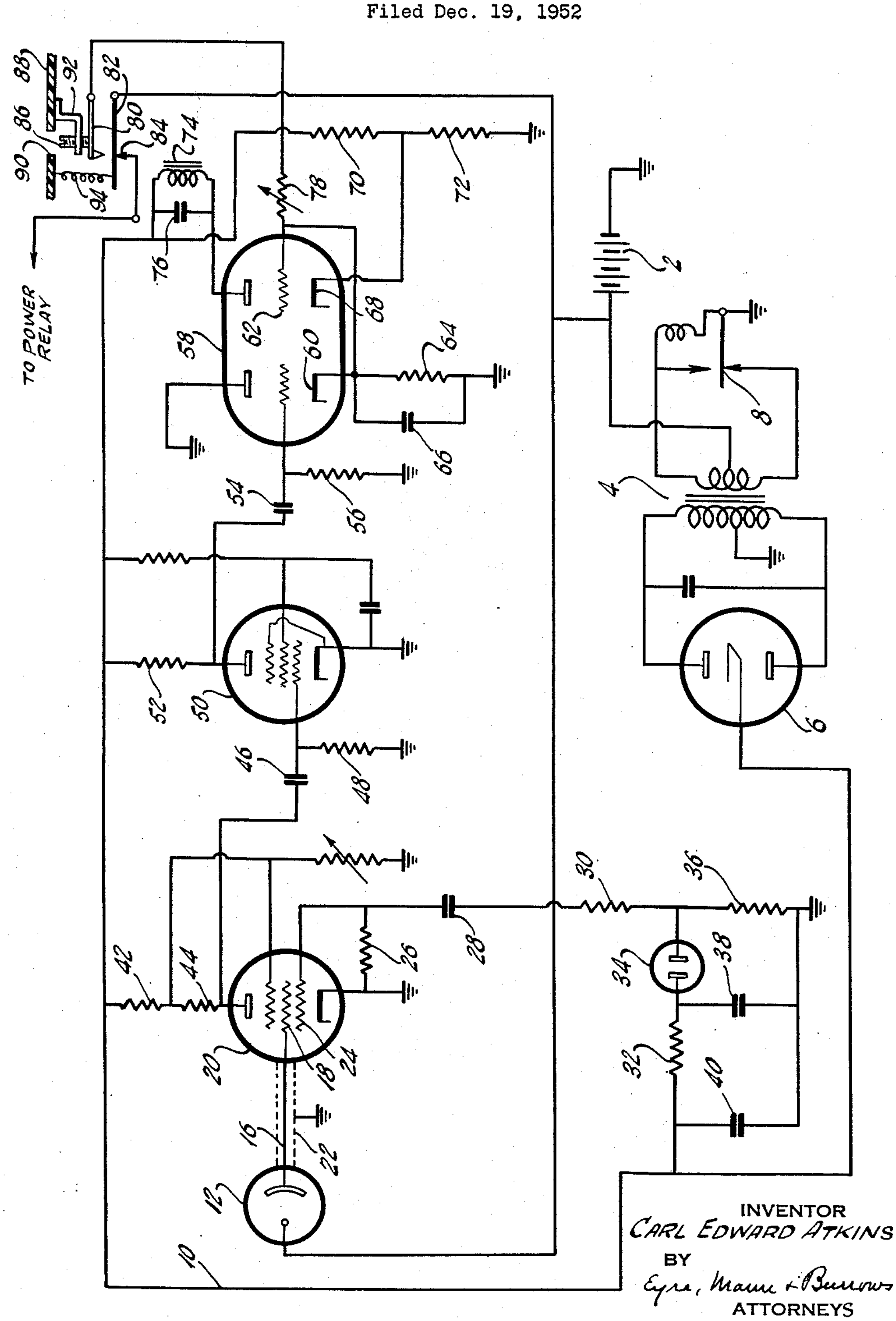
INVENTOR
CARL EDWARD ATKINS
BY
Eyre, Mann & Burrows
ATTORNEYS Patented June 29, 1954 2,682,624

UNITED STATES PATENT OFFICE 2,682,624

LIGHT-SENSITIVE CIRCUIT

Carl Edward Atkins, Bloomfield, N. J., assignor to Tung-Sol Electric Inc., a corporation of Delaware Application December 19, 1952, Serial No. 326,810

6 Claims. (Cl. 317—130)

My present invention relates to circuits for the automatic dimming of automobile headlamps in response to light from the headlamps of approaching cars and comprises a novel circuit of this type which utilizes few and relatively inexpensive circuit elements, may be operated from a 6-volt car carried storage battery, is rapid acting, sensitive, and stable. The circuit of the present invention is of the type of that disclosed and broadly claimed in my copending application Serial No. 297,946, filed July 9, 1952, entitled "Light Responsive Circuit," in that it includes means for accumulating small photoelectric currents and for intermittently releasing the accumulated charge to provide a pulsating current varying with the intensity of the light incident on the photo cathode of the tube and suitable for amplification by alternating current techniques.

The present circuit differs in a number of important respects from the specific circuits illustrated and described in the said copending application. In the earlier circuits the relay which operates in response to the amplified pulses created when light is incident on the photo cathode of the photoelectric tube, is normally energized and releases its armature in response to light signals of a predetermined magnitude. In the circuit of the present invention the corresponding relay is normally deenergized, being energized in response to receipt of light from headlights of approaching cars. By this relatively small difference I am able to make the electronic tube controlling the relay relatively insensitive to fluctuations in voltage and am also enabled to provide a simple and efficient means for ready adjustment of the sensitivity of the circuit. The circuit incorporates rectifying means for reversing the polarity of the pulse applied to the control grid of the relay control tube in order to operate the system with a normally deenergized relay as above indicated.

The new circuit includes in general a vibrator power supply energized from a 6-volt storage battery and utilized for creation of the high voltage for application to the electronic tubes of the system. The circuit, like those of the said copending application, utilizes a simple two-electrode photoelectric tube to the photo cathode of which is connected a lead provided with a grounded shield and serving as a distributed capacity for accumulation of the minute currents through the photoelectric tube. The lead is connected to an electrode of a normally blocked gating tube which is intermittently unblocked by any suitable means, as for example a relaxation oscillator coupled to the control grid of the gating tube. In the circuits of the earlier application the photo cathode of the photoelectric tube is connected to the anode of the gating tube. Superior operation with more rapid response and with improved stability is obtained when the shielded lead from the photo cathode is connected to a grid of the gating tube. The present circuit therefore incorporates this connection to a grid of a gating tube. Such connection is disclosed and claimed in my copending application filed on even date herewith and hence is not specifically claimed herein. The new circuit includes also amplifying and rectifying means connected between the gating tube and the normally deenergized relay control tube.

For a better understanding of the invention and of a circuit embodying the same, reference may be had to the accompanying drawing, the single figure of which is a circuit diagram of a system embodying the invention.

In the drawing a 6-volt storage battery is indicated by the reference numeral 2. The negative terminal of the battery is grounded and the positive terminal connected to the midpoint of the primary of a transformer 4, the secondary of which is connected to the anodes of a rectifying tube 6 which may be a 6X4. The opposite ends of the primary winding are intermittently grounded by means of a vibrator 8. The cathode of the rectifier 6 is connected to a lead 10 comprising the high voltage line of the system. Voltages of the order of 150 volts appear at line 10. A photoelectric tube 12 of the 2-electrode type, and preferably a hard tube such as a 922, has its anode connected to the positive terminal of the battery 2 and its cathode connected by a lead 16 to the No. 2 grid 18 of a gating tube 20. Lead 16 is shielded by a grounded cable 22 which, with the lead 16, comprises the distributed capacity for accumulation of the current through the photoelectric tube 12 when light is incident on the photo cathode thereof. The No. 1 grid 24 of tube 20 is connected through a bias resistor 26 to the grounded cathode of the tube and is connected through a condenser 28 and resistor 30 to a relaxation oscillator now to be described.

The high voltage lead 10 is connected through a large resistor 32 of say 7 megohms and a neon tube 34 to the junction of resistor 30 with a resistor 36, the other end of resistor 36 being grounded. A condenser 38 is connected between the junction of resistor 32 and the neon lamp 34 and ground, and a condenser 40 is connected between the line 10 and ground. Thus when the charge on condenser 38 is sufficient to raise the potential across the neon tube 34 to the breakdown point, the condenser 38 discharges through the neon tube and through resistor 36, raising the potential at the junction of that resistor with resistor 30 and therefore impressing a positive pulse upon the No. 1 grid 24 of the gating tube 20. Resistor 30 is substantially larger than resistor 36 and serves to broaden the pulses or pips applied to grid 24. If no light has fallen on the photo cathode of the photoelectric tube in the interval between the application of positive pulses to the No. 1 grid of the gating tube, no current will flow through the gating tube because of the negative potential on the No. 2 grid 18 thereof. When, however, the distributed capacity comprising the lead 16 and grounded shield 22 has accumulated a charge due to emission of electrons from the photo cathode of the tube 12, the potential of the No. 2 grid 18 of the gating tube will be high enough to permit current to flow through the gating tube at the moment when the positive pulse arrives from the relaxation oscillator. The anode of the gating tube 20 is connected to the high potential line 10 through a pair of series connected resistors 42 and 44 and is coupled through a condenser 46 and grid bias resistor 48 to the grid of an amplifier tube 50. Thus when light falls upon the photo cathode of the tube 12, a series of negative pulses varying in amplitude with the intensity of the light will appear at the anode of the gating tube and these negative pulses will be impressed upon the control grid of amplifier 50. The anode of amplifier 50 is connected to the high potential line 10 through a potential dropping resistor 52 and is coupled through a condenser 54 and grid bias resistor 56 to the grid of the first half of a double triode 58, the second half of which comprises the relay control tube. The anode of the first half of the double triode 58 is grounded so that rectification occurs between the grid and cathode 60 of that half of the tube 58. The cathode 60 is connected to the control grid 62 of the second half of the tube 58 and to ground through a bias resistor 64 by-passed by a condenser 66. The cathode 68 of the second half of the double triode 58 is maintained at a positive potential and for this purpose it is connected to the junction of resistors 70 and 72 connected in series between the high potential line 10 and ground, resistor 70 being substantially greater than resistor 72, of the order of about 10 to 1. A relay 74 bypassed by a condenser 76 is connected between the high potential line 10 and the anode of the second half of the double triode 58. The control grid 62 is connected through an adjustable resistor 78 of 10 megohms or the like to the back contact 80 of the armature 82 of the relay 74. The front contact 84 of the armature may be connected to any suitable power relay for operating the dimming switch of an automobile. The positive terminal of the battery 2 is connected to the armature 82.

With the above described arrangement, the potential of the grid 62 will be above ground because of the circuit including the back contact of relay 74, but the potential thereof in the absence of positive pulses at the grid of the first half of the tube 58 is well below that of the cathode 68. Accordingly the relay control tube does not pass current until positive pulses of a predetermined magnitude, dependent upon the setting of resistor 78, appear at the grid of the first half of tube 58 to increase the positive potential at the cathode 60 and grid 62.

The current through the winding of relay 74 required for pick-up of the armature 82 depends upon the location of the back contact 80. Thus by making adjustable the position of this contact, the minimum light intensity that will cause operation of the dimming switch may be controlled. Contact 80 is therefore mounted on an element, as for example a screw 86, which may be adjusted toward and away from the front contact 84 of the relay. In practice the relay 74 and other of the elements of the circuit are mounted within a suitable housing as in conventional practice. Preferably the screw 86 or other element carrying the back contact is so mounted that access may be had thereto through the housing wall. This is illustrated diagrammatically in the drawing, wherein a section of the housing wall is identified by the reference numeral 88 and this wall section is shown as having an aperture 90 above the screw 86 for entry of a screw-driver or other suitable tool for adjusting the contact spacing. The contact carrying screw 86, in the embodiment illustrated, is threadedly mounted in a bracket 92 secured to the wall 88 of the housing and the armature 82 of the relay is biased by a spring 94 into engagement with the contact 80 carried by the screw 86.

As less current through the relay winding is required for holding the armature in attracted position than for pick-up of the armature dimming of the lights of an approaching car with consequent reduction in current through the relay winding will not cause release of the armature and return of the dimming switch to high beam position. Also the sensitivity of the circuit when the armature is in attracted position is increased by the opening of the connection to resistor 78 as the opening of this circuit effectively increases the bias of grid 62. Thus the circuit provides for actuation of the dimming switch when the light incident on the cathode of the photoelectric tube is of a given intensity, the holding of the switch when the intensity of the incident light decreases to a lesser value, and finally for return to high beam conditions when the intensity of the light is so low that the current through the relay is insufficient to hold the armature in attracted position.

With the specific circuit connections of the relay control tube, fluctuation of battery voltage will not substantially affect the current through the tube. This is because a change of battery voltage in any direction will change the potential on each of the electrodes of the relay tube in the same direction and hence have no substantial bearing on the potential differences between the electrodes.

From the foregoing description of the preferred embodiment of the invention it will be apparent that the new circuit operates efficiently to close the circuit to a power relay or the like when light signals of a given intensity are received and to hold such circuit closed until the intensity of the light decreases below a predetermined magnitude. The circuit provides simple means for adjusting the sensitivity, is relatively insensitive to battery voltage fluctuations, and requires but few and inexpensive elements.

The following is claimed:

1. A light responsive circuit comprising in combination a light responsive element, means coupled to said element for creating a series of negative pulses varying in magnitude with the intensity of light incident on said element, means for amplifying and converting the created pulses to correspondingly varying amplified positive pulses, a relay control tube having a cathode, control grid and anode, a source of positive potential, a connection between said source and said anode, a relay winding in said connection, a potential divider connected across said source, said cathode being connected to said divider so as to be at a positive potential, and means for rectifying the amplified positive pulses delivered by said amplifying and converting means and for impressing the resulting positive potential upon said grid whereby the current through said relay winding will vary with the intensity of light incident on said element.

2. The circuit according to claim 1 including an armature associated with said relay winding, an output circuit adapted to be closed by said armature when in attracted position, a member engageable by said armature in retracted position, and means biasing said armature into engagement with said member, said member being adjustably mounted whereby the intensity of incident light required for closure of said output circuit may be controlled.

3. The circuit according to claim 2 wherein said member is screw-threadedly mounted and located for ready access thereto by a suitable tool.

4. The circuit according to claim 1 wherein said source of positive potential comprises a vibrator power supply energized by a low voltage storage battery the negative terminal of which is grounded, and wherein an armature connected to the positive terminal of said battery is associated with said relay winding, an output circuit is connected to a front contact engageable by said armature when in attracted position, and a back contact engageable by said armature in retracted position is connected through a resistor to the control grid of said relay tube whereby the sensitivity of the circuit is increased when the armature is in attracted position.

5. A light responsive circuit comprising a photoelectric tube having a single cathode and a single anode, means for accumulating photoelectric currents through said tube occasioned by light incident on the cathode thereof, means for intermittently discharging said accumulating means to create a series of negative pulses varying in magnitude with the intensity of light incident on said cathode, an amplifier connected to said last mentioned means for amplifying said pulses, a double triode the first half of which has its anode grounded, its control grid coupled through a condenser to said amplifying means and connected to ground through a grid leak resistor and its cathode connected to ground through a resistor, large compared to said grid leak resistor, and the second half of which has its control grid connected to the cathode of the first half of the double triode, its cathode connected for operation at above ground potential and its anode connected through the winding of a relay to a source of high positive potential, and an armature associated with said relay winding adapted when in attracted position to complete an output circuit and when in retracted position to decrease the grid bias of the control grid of the second half of the double triode whereby when the intensity of the light incident on the cathode of the photoelectric tube reaches a predetermined magnitude said armature moves to attracted position to close the output circuit and remains in that position until the intensity of the light reduces to a second predetermined magnitude.

6. The circuit according to claim 5 wherein the cathode of the second half of said double triode is maintained at positive potential by connection to a potential divider connected across said source, whereby current through said second half of said double triode is relatively insensitive to voltage fluctuations of said source.

References Cited in the file of this patent

UNITED STATES PATENTS

| Number | Name | Date |
|---|---|---|
| 2,125,073 | Knowles | July 26, 1938 |
| 2,140,355 | Gulliksen | Dec. 13, 1938 |
| 2,178,985 | Blumlein | Nov. 7, 1939 |
| 2,323,966 | Artzt | July 13, 1943 |
| 2,498,526 | Bucher | Feb. 21, 1950 |
| 2,499,921 | Hurley | Mar. 7, 1950 |
| 2,579,883 | Thomson | Dec. 25, 1951 |
| 2,614,247 | Boisvieux | Oct. 14, 1952 |